Sept. 6, 1955                     J. C. BELLAMY                     2,717,120
                      INTEGRATING DEVICE FOR INDICATING
                          GROUND POSITION OF AIRCRAFT
Filed July 12, 1950                                                2 Sheets-Sheet 1

INVENTOR.
John C. Bellamy.
BY
Thiess, Olsen Mecklenburger.
Attys.

United States Patent Office 2,717,120
Patented Sept. 6, 1955

2,717,120

INTEGRATING DEVICE FOR INDICATING GROUND POSITION OF AIRCRAFT

John C. Bellamy, Chicago, Ill., assignor to Cook Electric Company, Chicago, Ill., a corporation of Illinois Application July 12, 1950, Serial No. 173,443

11 Claims. (Cl. 235—61)

This invention relates to computing devices of the integrating type, more particularly to an integrating device for indicating the ground position of aircraft, and it is an object of the invention to provide improved apparatus of this character.

It is a further object of the invention to provide an improved integrating device of high accuracy capable of accommodating positive and negative values of data.

It is a further object of the invention to provide an aircraft ground position indicator of high accuracy which is operative irrespective of the direction in which the aircraft moves.

It is a further object of the invention to provide an aircraft ground position indicator of the character described which is substantially free from external influences.

The navigation of aircraft presents a complex situation because of the high speed at which aircraft may move, and consequently the large distances which the aircraft may travel during relatively short intervals of time. The aircraft navigator may have other duties, and while he may pay virtually continuous attention to navigational factors such as air speed, compass readings, and wind directions and velocities, he cannot make computations except at specified times which may be separated by substantial intervals of time, for example, several minutes. A computation, then made, is based upon an average value of the factors involved during the preceding interval and thus is subject to possible large errors.

The described situation may apply aptly to a large bomber or commercial plane where several persons may comprise the crew, but in a pursuit ship the navigation problem becomes more acute because the pilot is the only person aboard. During a dog fight, for example, a pursuit ship pilot pays no attention to navigation and yet may travel many miles from his base. At the end of the action, when the pilot desires to return to his base, the whereabouts thereof may be a serious question and it is of great advantage to have the latitude and longitude of the aircraft position. This information plus the latitude and longitude of the base, which the pilot will have, will tell which direction to go and will indicate in general the distance to be traveled.

Accordingly, it is a further object of the invention to provide an improved device of the character indicated for giving, in aircraft, a continual indication of latitude and longitude with high accuracy.

The problem of locating an aircraft by its latitude and longitude requires the integration of the north-south and east-west directional components of its true ground speed for the length of time that the aircraft is flying. The true ground speed irrespective of direction is determined by the true air speed and the wind force or velocity. Each of these factors is a vector quantity; that is, each has magnitude and direction and thus the problem resolves itself, in part, into one of adding or subtracting vector quantities and integrating with respect thereto. While not necessary, it has been found desirable to resolve each of the vector quantities into east-west and north-south components and to deal with the components. The integration is carried out by measuring the combined east-west components and north-south components of air speed and wind velocity during successive equal intervals of time and assuming that the airplane speed and direction, and the wind velocity and direction, are constant during each time interval. The intervals of time may be so chosen that this condition is accurately met.

Each aircraft contains a compass which may be of the magnetic, gyro, or other type, and an air speed indicator from which the direction and the air speed, respectively, of the aircraft may be continuously obtained. The wind force and direction may be obtained from weather bulletins transmitted by radio to the aircraft.

It is a further object of the invention to provide an improved device of the character indicated which is shall in size, light in weight, economical to make, and efficient in operation.

In carrying out the invention in one form, an aircraft ground position indicator is provided comprising, means for obtaining voltage magnitude components of the east-west and north-south components of the true air speed and the wind velocity as a percentage of assigned maximum values, means for combining the east-west components and the north-south components respectively, a first potentiometer means having a voltage cycle varying uniformly between two certain values one of which values is zero and the other of which is an arbitrary value corresponding to the assigned maximum values of combined north-south components, means for driving the first potentiometer means through its cycle during each of successive time intervals, the intervals of time being sufficiently short that the north-south component is sensibly constant therein, means for continuously comparing the north-south component voltage with the potentiometer voltage from one of the certain values to the other during each of the time intervals, a latitude indicator, means for coupling the latitude indicator to the driving means, means controlled by the comparing means for energizing the latitude indicator coupling means in each of the time intervals for a length of time equal to the time necessary for the first potentiometer to be displaced between its zero value and the value of the first potentiometer voltage which equals the north-south component voltage during such interval, a longitude indicator, second potentiometer means having a voltage cycle varying uniformly between two certain values one of which is zero and the other of which is an arbitrary value corresponding to the assigned maximum combined east-west components, the second potentiometer means being driven by the driving means through its cycle during each of the successive time intervals, means associated with a latitude indicator and receiving the second potentiometer voltage for producing the product thereof and the cosine of the latitude angle, means for continuously comparing the combined east-west component voltage with the product voltage from one of the second potentiometer certain values to the other during each of the time intervals, means for coupling the longitude indicator to the driving means, means controlled by the comparing means for energizing the longitude indicator coupling means in each of the time intervals for a length of time equal to the time necessary for the second potentiometer to be displaced between its zero value and the value of the second potentiometer voltage where the product thereof and the cosine of the latitude angle equals the east-west component voltage during such interval.

For a more complete understanding of the invention, reference should be had to the accompanying drawings in which:

Figure 1 is a schematic view of apparatus embodying the invention;

Fig. 2 is a schematic view in somewhat greater detail of the apparatus shown in Fig. 1, and Figs. 3, 4, 5 and 6 are diagrams for explaining the operation of the invention.

Referring to the drawings, the invention is shown embodied in a ground position indicator which may be mounted in aircraft, for example, the apparatus comprising a latitude and longitude indicator 11, wind force and direction apparatus 12, true air speed and direction apparatus 13, mechanism for determining the combined value of the speed and wind north-south and east-west components including the potentiometers 14, the latitude angle resolver 15, the east-west phase detector 16, and the north-south phase detector 17, mechanism 18 for driving the potentiometers and the indicators, a timer 19 for determining the time interval of value sensing, and a power supply 21.

The latitude and longitude indicator 11 comprises a latitude indicator 51 and a longitude indicator 52 which may be of any well known form, the latitude indicator indicating degrees and minutes, for example, up to 90 degrees, and the longitude indicator indicating degrees and minutes, for example, up to 180 degrees. The latitude and longitude indicators are driven from motor 53 through a series of gears and clutches, and are caused to move during successive time intervals an amount determined by the magnitude and direction of the true air speed given on apparatus 13 and the wind velocity set on apparatus 12. The length of the time intervals is determined by timer 19 and in this invention is chosen to be two seconds. This interval is sufficiently short so that despite changes in aircraft speed and wind velocity these factors are constant therein.

The north-south and east-west components of wind velocity and true air speed are obtained in terms of voltage magnitude respectively from apparatus 12 and 13 and are sensed during each interval by potentiometers 14 sweeping through a voltage cycle beginning with zero, the point of equality of the potentiometer voltages and the component voltages being determined by the north-south and east-west phase detectors 17 and 16. The amount of movement of the latitude indicator 51 and the longitude indicator 52 in each interval of time is proportional to the amount of movement of potentiometers 14 between their voltages being zero and equal to the component voltages in the case of the latitude indicator and having the product of the potentiometer voltage and the cosine of the latitude angle equal to the component voltage in the case of the longitude indicator.

In the apparatus shown in the drawings, wind force and direction apparatus 12 comprises a wind force or velocity potentiometer 22 and a wind direction resolver 23. The true air speed and direction apparatus 13 comprises a true air speed potentiometer 24 and a true heading resolver 25.

The wind velocity potentiometer 22 comprises a resistor or an impedance 26 across which an A. C. voltage may be applied from a source 21 through a circuit to be described subsequently in this specification, and a tap 27 which may move to any point along impedance 26 under the influence of a hand wheel or like member 20. The magnitude of the voltage applied across impedance 26 may be of any arbitrary value, as will be made clear. The position of tap 27 along impedance 26 corresponds to the wind force or velocity. Thus, if tap 27 is moved to tap off the full voltage of impedance 26, the wind force indicated is an arbitrary assigned value equal to or greater than the maximum value which the aircraft is expected to encounter, and when the tap 27 is moved to tap off zero voltage, the wind velocity indicated is zero. Different positions of tap 27 between zero and maximum indicate varying percentages of the arbitrary expected wind velocity. Consequently, the voltage applied to impedance 26 may be an arbitrary value and may change in value without affecting the accuracy so long as other apparatus is affected in like manner, as will be made clear. The manual member 20 may include calibrations from zero to a maximum value.

The wind direction resolver 23 may comprise a rotatable coil 28 and a pair of fixed coils 29 and 31 inductively coupled thereto. The coils 29 and 31 are mounted at right angles to each other and may be defined, respectively, as the north-south and east-west component windings. The voltage induced into winding 29 by winding 28 is equal to the product of the voltage of winding 28 and the cosine of the angle $\theta$ between these windings. Correspondingly, the voltage induced into winding 31 is equal to the product of the voltage of winding 28 and the sine of the angle $\theta$. The angle $\theta$ corresponds to the wind direction with respect to true north, for example, and thus the voltages induced into windings 29 and 31 correspond to north-south and east-west components of the wind velocity. The coil 28 is connected to a manual member, for example a hand wheel 32, by means of which the pilot can turn winding 28 to the direction of the wind, i. e. the angle $\theta$. As the wind direction, $\theta$, changes from westerly (as shown) to easterly, the direction of the voltage induced into winding 31 changes in direction or relative instantaneous polarity since the relative directions of the turns in windings 28 and 31 are reversed. Likewise, if the wind direction changes from northerly to southerly, the instantaneous voltage of winding 29 changes direction because of the change in relative direction of the turns of windings 29 and 28.

The winding 28 is supplied with voltage from impedance 26 through conductors 33 and 35, the conductor 35 being connected to the movable tap 27. Accordingly, the winding 28 is supplied with a voltage determined by the position of tap 27 and which corresponds to the wind velocity as set by manual member 20, and thus the windings 29 and 31 develop voltages corresponding to the north-south and east-west components, respectively, of wind velocity irrespective of direction.

The true air speed potentiometer comprises a resistor or impedance 36 across which the same arbitrary A. C. voltage may be applied as is applied to impedance 26 through a circuit to be described subsequently in this specification, and a tap 37 which may move to any point along impedance 36. The tap 37 may be connected to an air speed indicator, as indicated, whereby tap 37 moves along impedance 36 as determined by the air speed. The position of tap 37 along impedance 36 corresponds to the true air speed. If tap 37 is moved to tap off the full voltage of impedance 36, the true air speed indicated is an arbitrary assigned value equal to or greater than the maximum value which the aircraft is expected to have, and when the tap 37 is moved to tap off zero voltage, the air speed is zero. Different positions of tap 37 between zero and maximum indicate varying percentages of the arbitrary expected true air speed. Variations in voltage across impedance 36 do not affect the accuracy of the apparatus for the same reasons as for impedance 26. The true air speed indicator is, of course, calibrated relative to impedance 36 and tap 37 so that tap 37 occupies its proper position.

The true heading resolver 25 may comprise a rotatable coil 38 and a pair of fixed coils 39 and 41 inductively coupled thereto. The coils 39 and 41 are mounted at right angles to each other and may be defined respectively as the north-south and east-west component windings. The voltage induced into winding 39 by winding 38 is equal to the product of the voltage of winding 38 and the cosine of the angle $\phi$ between between these windings. Correspondingly, the voltage induced into winding 41 is equal to the product of the voltage of winding 38 and the sine of the angle $\phi$. The angle $\phi$ corresponds to the direction of the heading with respect to true north, for example, and thus the voltages induced into windings 39 and 41 correspond to north-south and east-west components of true air speed. The coil 38 is connected to a compass, for example, represented by the member 42, whereby the coil 38 occupies a position corresponding to the compass indication or true heading of the aircraft, i. e. the angle $\phi$, if the compass is of the gyro variety. If a magnetic compass is used, a correction for local declination must be made. As the heading, $\phi$, changes from westerly, as shown, to easterly, the direction of the voltage induced into winding 41 changes in direction or relative instantaneous polarity since the relative direction of the turns in windings 28 and 31 is reversed. Likewise, if the heading changes from northerly to southerly, the voltage of winding 29 changes direction because of the change in relative direction of the turns of windings 39 and 38.

Winding 38 is supplied with voltage from impedance 36 through conductors 43 and 44, the conductor 43 being connected to the movable tap 37. Accordingly, the winding 38 is supplied with a voltage determined by the position of tap 37 and which corresponds to true air speed, as determined by the true air speed indicator, and thus the windings 39 and 41 develop voltages corresponding to the north-south and east-west component of true air speed.

Since the true air speed and the wind velocity normally differ widely from each other, and in general the true air speed will be much greater than the wind velocity, the transformation ratios between windings 28, 29 and 31, and 38, 39 and 41 are chosen in order that the output voltages correctly correspond to the relative values of the air speed and wind velocity.

The windings 31 and 41 are connected in series, and the windings 29 and 39 are connected in series whereby the voltages of these respective pairs of windings are combined and may be compared in each interval of time with voltages swept through by potentiometers 14 for determining the values of the combined true air speed and wind velocity components; that is to say, the ground speed components. The point at which the combined north-south components of windings 29 and 39 are equal to the voltage developed by potentiometer 14 is determined by the north-south phase detector 17.

Since the number of degrees of longitude corresponding to a given number of miles traveled varies with the latitude at which the travel takes place, the combined east-west components of windings 31 and 41 are compared with the voltage swept through by potentiometer 14 and a latitude phase resolver 15, the point at which the combination east-west component is equal to the potentiometer and phase resolver voltage being determined by the east-west phase detector 16. That is to say, by virtue of the potentiometer 14, which is caused to sweep through its voltage cycle during each time interval as determined by the timer 19, the combined north-south and east-west components are sensed during each of the time intervals and the latitude and longitude indicators are actuated appropriately, as will be explained more fully subsequently in this specification.

Figures 1, 3, 4:
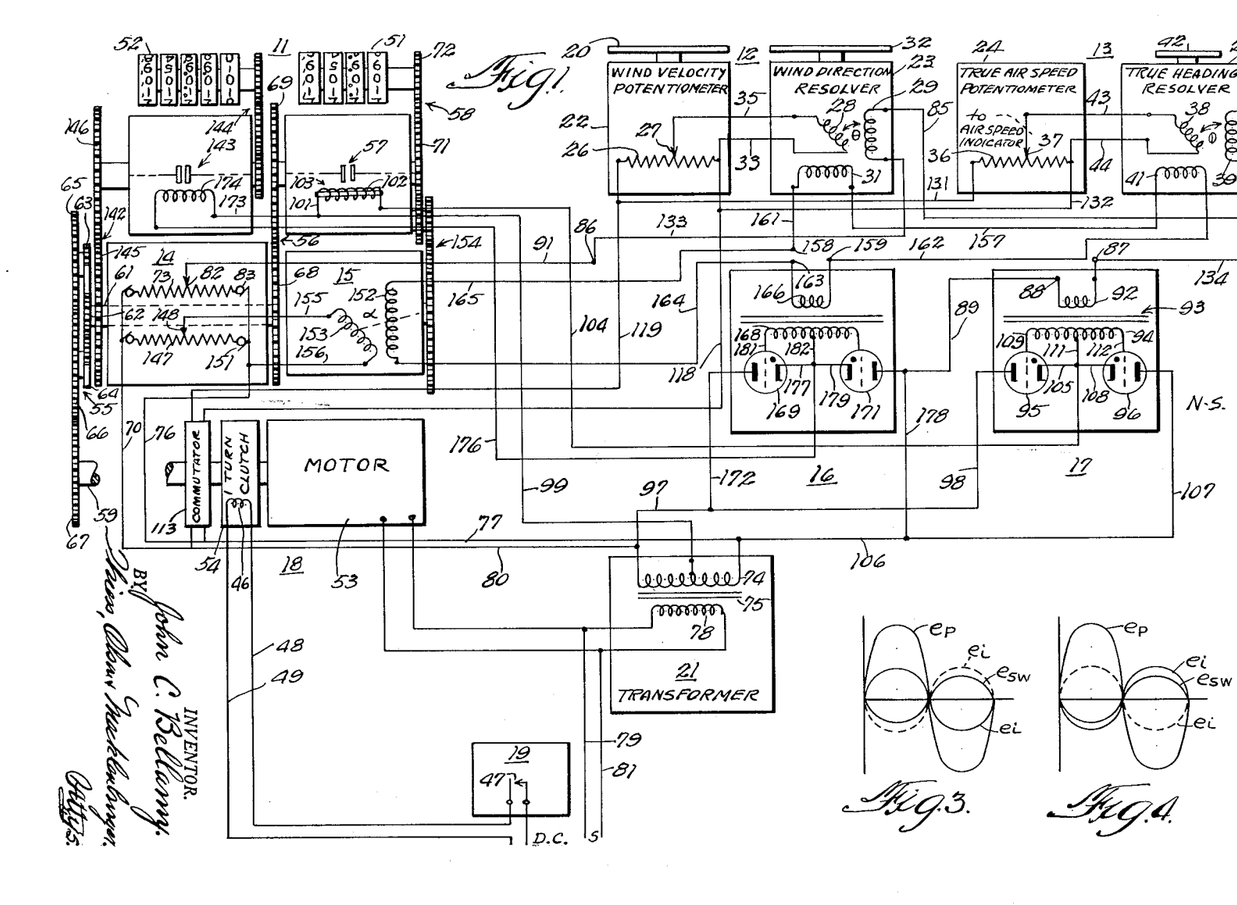
Figures 2, 5, 6:
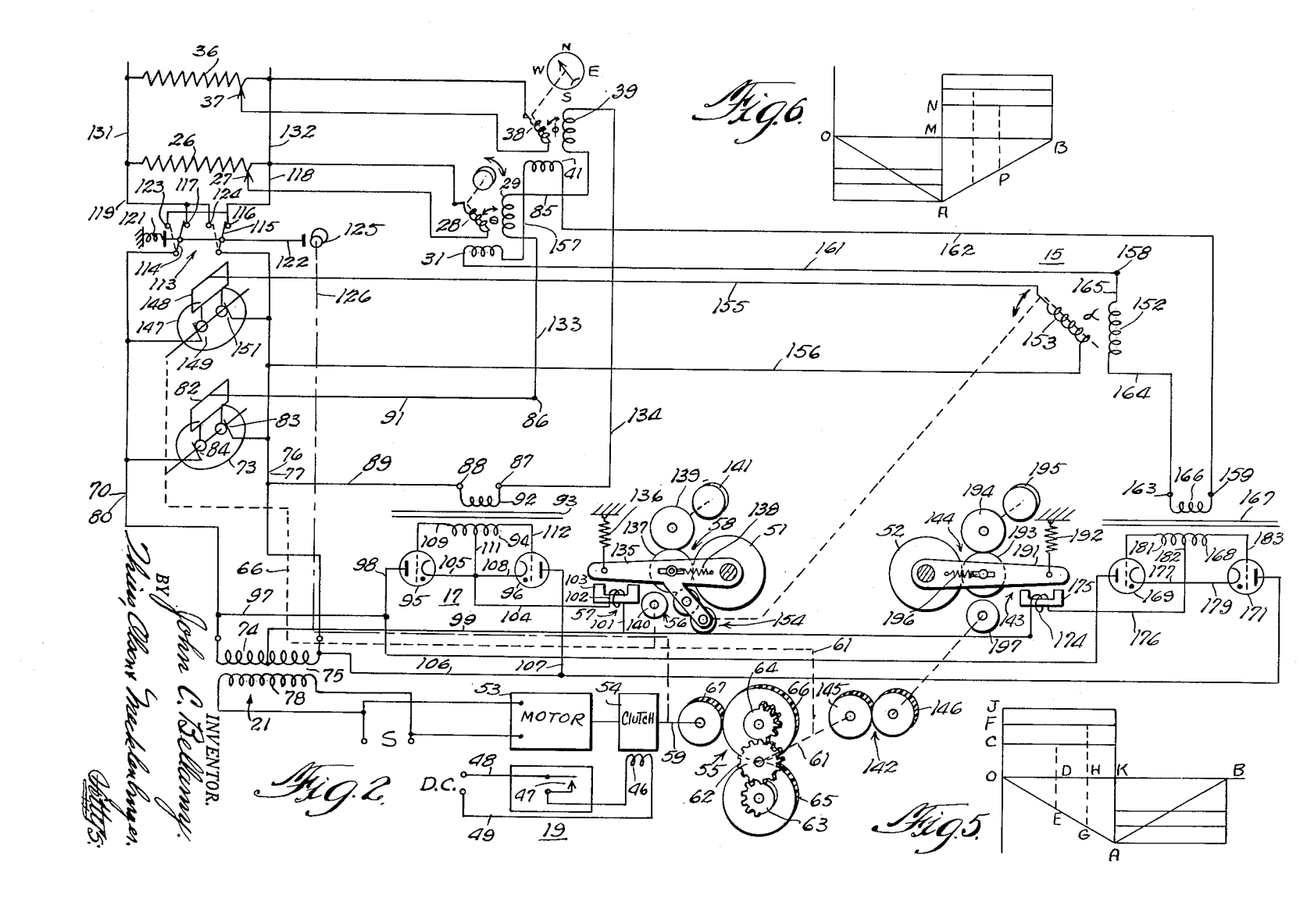

Referring to Figs. 1 and 2, it will be seen that the motor 53 drives latitude indicator 51 through a one-turn clutch 54, a gear system 55, a gear system 56, a clutch 57, and a gear system 58. The gear system 55 is devised in order that the indicator 51 may be driven in one direction for half a revolution of clutch 54 and in the other direction for the other half revolution of clutch 54. The motor 53 rotates continuously, but turns shaft 59 one revolution for each energization of one-turn clutch 54, the clutch 54 being energized once during each of the two second intervals determined by timer 19. The motor 53 may rotate sufficiently fast to complete one revolution of shaft 59 in less than the time interval determined by timer 19, and within the time interval its speed may vary, but it must always complete one revolution in that time interval.

The one-turn clutch 54 may be of any well known type which, after energization, rotates one revolution and stops to wait for a further energization. Clutch 54 is energized for each revolution by current flowing in winding 46. Current is supplied to winding 46 from a D. C. source through normally open contacts 47 and conductors 48 and 49.

The timer 19 may be of any type, such as a clock closing and opening the contacts 47 at exact intervals of time. If a sufficiently accurate speed motor is available, the timer 19 and clutch 54 may be eliminated and the apparatus driven directly.

The indicator 51 is driven by the systems of gears 55, 56 and 58 only so long as the clutch 57 is energized. The percentage of a revolution of one-turn clutch 54 and the percentage of a cycle of potentiometer 14 during which clutch 57 is energized depends upon the value of the combined north-south true air speed and wind velocity components, as determined by a comparison of the combination north-south component voltage with the voltage of potentiometer 14.

The gear system 55 is of a character that causes shaft 61 to rotate a full revolution in one direction followed by a full revolution in the reverse direction for each rotation of shaft 59, i. e. each rotation of clutch 54. This may be carried out by providing a gear 62 mounted on shaft 61 and driving gear 62 by means of a pair of segmental gears 63 and 64 which have gear teeth around only half of their peripheries and oriented so that while the gear teeth of gear 64 engage gear 62 the area of no gear teeth on gear 63 is in cooperation with gear 62, and vice versa. The segmental gear 63 is mounted so as to rotate with a gear 65, and the segmental gear 64 is mounted so as to rotate with gear 66, the gears 65 and 66 being of equal circumferences and engaging each other. Gear 66 engages gear 67 which is mounted on shaft 59 for driving the gear system 55.

Mounted on shaft 61 is a gear 68 which meshes with gear 69, gears 68 and 69 forming part of gear system 56. Gear 69 drives a gear 71 through clutch 57 and gear 71 meshes with a gear 72 for driving latitude indicator 51, gears 71 and 72 forming part of gear system 58. The ratio of gears 63 and 64 to gear 62 is to 2 to 1 so that for each half revolution of gears 63 and 64 the gear 62 rotates a full revolution. Thus, for each revolution of gear 67 permitted by the one-turn clutch 54, the shaft 61 will rotate a full revolution in one direction followed by a full revolution in the other direction. Consequently, if clutch 57 were to remain continuously engaged, the latitude indicator 51 would rotate a specified amount in one direction, for example, in increasing indication of latitude followed by a rotation of an equal amount in the reverse direction, that is, in a decreasing indication of latitude. By appropriately energizing clutch 57 during the proper direction of rotation of shaft 61 as will be completely described, the latitude indicator will operate in one direction if the aircraft is traveling north, and in the other direction if the aircraft is traveling south.

The clutch 57, which may be of any form, and one form thereof will be described subsequently in this specification, is electrically energized for the proper length of time by current flow through the winding 102 under the control of the north-south phase detector 17, the combination north-south air speed and wind velocity component voltage and the voltage of potentiometer 14, as may now be described.

Mounted so as to be rotated by shaft 61 is a slide wire or the like 73 forming part of potentiometer 14, the ends of slide wire 73 being connected to the secondary winding 74 of transformer 75 by conductors 76, 77 and 70, 80. The transformer 75 includes a primary winding 78 connected to conductors 79 and 81 leading to a source of alternating voltage of suitable magnitude and frequency. The voltage of secondary winding 74 is an arbitrary value suitable for the apparatus and is also supplied to impedances 26 and 36, as will be further pointed out. Cooperating with slide wire 73 is a tap 82 which taps off voltage varying from zero to full value along slide wire 73 depending on the position of the tap for comparison with the combination north-south component voltage.

Referring to Fig. 2, it will be seen that the slide wire 73 may be in the form of a spiral to the ends of which a voltage is applied from conductors 76, 77 and 79, 80 through brushes and slip rings 83 and 84, and tap 82 corresponds to a plate of the same reference character which is adapted to engage the spiral slide wire during its rotation. The spiral slide wire 73 is mounted so as to be rotated by shaft 61 represented in Fig. 2 by the dotted line bearing this reference character. The slide wire spiral is of only a single revolution so that in each revolution thereof the voltage experienced by tap 82 varies from zero to the maximum value. Consequently, since shaft 61 rotates a full revolution in one direction followed by a full revolution in the other direction, the voltage experienced by tap 82 varies from zero to a maximum and from the maximum to zero. It is not essential that the slide wire voltage follow this cycle; it may, for example, vary from zero to maximum or vice versa twice in succession provided appropriate adjustments in the other apparatus are made.

Referring to Figs. 1 and 2, the circuits for combining the north-south component voltages and for comparing the combination voltage with the voltage of slide wire 73 may be followed. The impedance 26 of the wind velocity potentiometer 22 is supplied with the voltage of secondary winding 74 through conductors 77 and 80, commutator 113, and conductors 118 and 119, and the impedance 36 of the true air speed potentiometer 24 is supplied with the same voltage through the same circuit and the conductors 131 and 132. The windings 28 and 38 are supplied with voltage from the impedances 26 and 36 through circuits already described. The north-south component windings 29 and 39 are connected in series by means of conductor 85, and the combined voltages of these two windings appear across terminals 86 and 87 by virtue of conductors 133 and 134. Whether or not the voltages of windings 29 and 39 add to or subtract from each other depends upon whether the north-south components of the wind velocity are in the same direction as, or in opposition to, the north-south components of the airplane air speed and the turns of the windings of the wind direction resolver 23 and of the true heading resolver 25 are oriented to take this into account. The tapped off voltage of slide wire 73 appears across terminals 86 and 88 and is obtained through a circuit as follows: From terminal 88 through conductor 89 (conductors 77, 76), brush and slip ring 83, a proportion of slide wire 73, tap 82, and conductor 91 to terminal 86. The difference of the voltages appearing at terminals 86 and 87 (the resultant or combined north-south component of wind velocity and air speed) and the terminals 86 and 88 (the slide wire voltage varying from zero to its maximum value) appears across terminals 87 and 88 and is applied to the primary 92 of transformer 93, whose secondary winding is 94. The difference voltage appearing across terminals 87 and 88 is utilized to control functioning of the north-south phase detector 17 and consequently energization of clutch 57, all of which may be explained as follows.

The north-south phase detector comprises a pair of thyratron type tubes 95 and 96 connected in full wave relationship, current conduction through these tubes being determined by in-phase and out-of-phase relationship of the plate voltage supplied from secondary winding 74 and the grid voltage supplied from secondary winding 94. Plate voltage is applied to the tube 95 through a circuit which may be traced as follows: From the left end of winding 74 through conductors 97 and 98 to the plate of the tube, and from the center tap of winding 74 through conductors 99 and 101, the coil 102 of clutch magnet 103, and conductors 104 and 105 to the cathode of tube 95. Plate voltage is applied to tube 96 through a circuit which may be traced as follows: From the right end of winding 74 through conductors 106 and 107 to the plate of the tube, and from the center tap of winding 74 through conductors 99 and 101, winding 102, and conductors 104 and 108 to the cathode of tube 96. Grid voltage is applied to tube 95 through a circuit which may be traced as follows: From the grid of tube 95 to the left end of winding 94, through conductor 109, and from the center tap of winding 94 through conductors 111 and 105 to the cathode of the tube. Grid voltage is applied to the tube 96 through a circuit which may be traced as follows: From the grid to the right end of winding 94 through conductor 112 and from the center of winding 94 through conductors 111 and 108 to the cathode.

The tubes 95 and 96 operate as is well understood for tubes of the thyratron type. Since alternating voltage is applied to the cathode-plate circuit, current in any event can flow in the appropriate tube only while this voltage is positive, and the current stops whenever the plate voltage becomes zero. Moreover, the tubes conduct only when the grid voltage is in phase with the plate voltage when the plate voltage is positive; that is, the grid voltage is positive or, at any rate, is positive relative to some fixed negative bias. Tubes 95 and 96 being connected in full wave relationship, current will flow through winding 102 during each half cycle of the alternating voltage.

Whenever the winding 102 has current flowing therethrough, the magnet 103 becomes energized to effect engagement of clutch 57, and the flow of current through winding 102 is determined by the slide wire voltage and the combined north-south component voltages as appear at terminals 87 and 88.

Referring to Fig. 3, there is shown a series of sine waves which may represent the voltages applied to tubes 95 and 96. In this instance, $e_p$ represents the plate-cathode voltage of tube 95, for example, the solid curve $e_i$ may represent the combined north-south voltage components (combined wind velocity and air speed components) when the aircraft is heading north, for example, and the curve labeled $e_{sw}$ represents the slide wire voltage at a particular time, it being noted that the slide wire voltage is in opposition to the combination north-south voltage (i. e. negative). The windings 92 and 94 of transformer 93 are so wound that the slide wire voltage is negative with respect to the plate-cathode voltage. The voltage relationships may be further visualized by referring to Fig. 5 wherein the horizontal lines represent values of $e_i$ or combination north-south voltages, and the lines OA and AB represent the slide wire voltage variations each throughout the whole cycle of slide wire operation. Since slide wire 73 is operated by shaft 61 and shaft 61 rotates first in one direction a full revolution and then in the opposite direction for a full revolution, the slide wire 73 makes these same revolutions. Consequently, the slide wire voltage varies uniformly from zero to its arbitrary maximum negative value and from its arbitrary maximum value to zero during each timing interval.

It is assumed, in the first instance, that the aircraft is headed due north and thus the latitude indicator is to indicate degrees of latitude north, the longitude change thus being zero. For this condition, at the instant the one-turn clutch 54 functions to effect rotation of shaft 61, and consequently of slide wire 73, the slide wire voltage is zero, as represented by the origin O in Fig. 5, since the tap 82 is at the beginning of the slide wire. At that instant the properly combined value of the north-south wind velocity and air speed components may be represented by the ordinate OC, that is, $e_i = OC$. There is, then, a positive value of voltage applied to the grid of tube 95 whereupon this tube conducts and energizes clutch 57 (winding 102) whereby the latitude indicator 51 is caused to move through the gears shown. As the slide wire 73 rotates, however, its voltage increases negatively, as indicated by line OA, and when this voltage becomes equal to the north-south component, that is, $OC=DE$, the difference between the slide wire voltage and the north-south component voltage is zero, and the voltage applied across terminals 87 and 88, that is, to the grid of tube 95, is zero. When the plate voltage $e_p$ next comes through zero (Fig. 3) at the beginning of a positive half cycle, the current does not begin to flow since the continued rotation of the slide wire decreases the voltage along the line OA and thus places a negative voltage on the grid of tube 95. If the combination north-south voltage (combined wind velocity and air speed) had been equal to a value represented by the ordinate OF, the slide wire 73 would have had to rotate sufficiently farther to the point G in order that $HG=OF$ before conduction of current ceased. Correspondingly, if the north-south component had been greater, that is, equal to a value represented by the ordinate OJ, the slide wire would have had to rotate a full revolution, that is, to point A, in order that the full slide wire voltage represented by the ordinate KA be equal to the value OJ.

The apparatus is constructed so that the grid voltage of tubes 95 and 96 can only be in phase or 180 degrees out of phase with the plate-cathode voltage. The transformer windings 92 and 94 are wound so that the voltage across winding 94 is 180 degrees out of phase with the voltage across winding 74. If minor phase shifts occur in some of the components, well known phase correcting networks may be used. The transformation ratio between windings 92 and 94 is such that the grid voltage and plate-cathode voltage are of the correct relative magnitudes.

During each of the operations just described, that is, for different values of combination north-south wind velocity and air speed, the tube 96 also conducts but it conducts on the negative half cycle during which tube 95 does not conduct, as is well understood. In this manner current flow to winding 102 is sufficiently continuous that there is no likelihood of clutch malfunctioning.

The slide wire 73, after having completed its revolution in one direction (voltage varies from zero to a maximum) it reverses its direction of rotation due to gear system 55 and its voltage decreases from the maximum negative value to zero at point B. During this interval of reverse rotation, the clutch 57 should be de-energized, since if not, the latitude indicator 51 would rotate backwards. That is, when going north and the apparatus is set up for operating in this direction, the latitude indicator 51 should not rotate during the reverse revolution of the slide wire. This condition is brought about by the provision of a commutator 113 which reverses the north-south component voltage at the instant the slide wire has completed its forward revolution and is about to begin its rearward revolution.

Referring to Fig. 2, it will be seen that the commutator 113 may comprise a reversing switch having a pair of conducting arms 114 and 115 connected respectively to conductors 70, 80 and 76, 77. When slide wire 73 is rotating in its forward revolution, contact arms 114 and 115 engage terminals 116 and 117, thereby supplying voltage of the correct phase to conductors 118 and 119, as already described. Conducting arms 114 and 115 may be held in the position shown by means of a spring 121. The conducting arms 114 and 115 may be linked to an insulating arm 122 by means of which the conducting arms can be moved to positions shown dotted, that is, to engage terminals 123 and 124. This may be accomplished by means of a cam 125 operated from shaft 59, as indicated by the dot-dash line 126. Moving contact arms 114 and 115 to engage terminals 123 and 124 reverses the instantaneous polarity of conductors 118 and 119 relative to conductors 76, 77 and 70, 80, thereby reversing the instantaneous polarity of the voltage across impedances 26 and 36. Accordingly, the combination north-south component voltage from windings 29 and 39 corresponding to wind velocity and air speed, i. e. $e_i$, becomes reversed, as shown on Fig. 3 by the dotted line designated $e_i$. In this condition, both the slide wire voltage, $e_{sw}$, and the combination north-south component voltage are negative, as may also be seen by reference to Fig. 5 for slide wire voltages varying along the line AB. Since the grid voltage during this phase is completely negative, there is no current flow through winding 102 and the clutch 57 remains unenergized. Accordingly, the north latitude indication, while the aircraft is going north, remains on the indicator 51.

Suppose, however, that the aircraft should turn around and head south instead of north, or in a southerly direction so that there is a southerly component of speed instead of a northerly component, the wind velocity component remaining as before. The operation of the apparatus during this condition may be understood by referring to Figs. 4 and 6.

When the aircraft is heading due south, the winding 39 of the true heading resolver 25 is physically reversed in direction from a due north heading, and consequently the voltage induced into winding 39 is reversed in instantaneous phase from that for a north heading. Consequently, the north-south component voltage obtained at terminals 86 and 87 is reversed in instantaneous phase, that is, is negative compared to the previous value, and is shown as the solid sine wave labeled $e_i$ in Fig. 4. Assuming that the slide wire 73 is beginning a new cycle of operation, its voltage, of course, is zero but it becomes progressively more negative. Thus, during the first revolution of slide wire 73 on a south heading of the aircraft, both the north-south component voltage and the slide wire voltage are negative. The voltage applied to the grids of tubes 95 and 96 is negative and no current flows through winding 102. Consequently, the clutch 57 remains unenergized and latitude indicator 51 remains stationary. The negative grid voltage during the first revolution of slide wire 73 may be noted by observing the left half of Fig. 6 wherein the line OA represents the slide wire voltage and the horizontal lines intersecting therewith represent the various possible values of the south component voltage.

On the reverse revolution of the slide wire 73 during the second half of its cycle, however, that is, the voltage varies along line AB of Fig. 6, a positive voltage is applied to the grids of tubes 95 and 96 during a portion of the slide wire revolution. When the slide wire has completed its first revolution, commutator 113 causes the instantaneous phase of the voltage on conductors 118 and 119 to reverse, as already explained, whereupon the south component of the voltage is reversed and consequently becomes positive, as indicated by the dotted wave $e_i$ in Fig. 4. As the slide wire 73 begins to rotate in the reverse direction, the voltage developed by it is a maximum negative, as represented by the ordinate MA, and unless the south component is equal to this value, the tubes 95 and 96 will remain nonconducting. However, assume that the south component is equal to the ordinate MN, that is, the dotted sine wave of Fig. 4. As the slide wire continues to rotate, the voltage developed by it decreases until at the point P it equals the south component MN. At this point the grid voltage becomes zero and thereafter becomes positive. Consequently, from point P on to point B the total grid voltage is in phase with the plate voltage instead of being 180 degrees out of phase and current flows through winding 102, as already explained. This current continues to flow throughout the remainder of the slide wire cycle, that is, for the remainder of the revolution of the slide wire from P to B, and clutch 57 is energized. Consequently, latitude indicator 51 is moved in the reverse direction and the latitude indications thereof are progressively decreased.

Hence, north as well as south, that is, positive as well negative, integrations of speed are obtained.

A full revolution of the slide wire corresponds to the maximum value of combined wind velocity and air speed which the instrument can handle accurately. This maximum value may be arbitrarily assigned and the instrument constructed accordingly. If the maximum ground speed which the aircraft is expected to have is six hundred miles per hour north-south, which for example may be assumed to be five hundred miles per hour of air speed and one hundred miles per hour of wind velocity in the same direction as that of the aircraft, the slide wire 73 may be made to rotate a full revolution to balance out the appropriate combination north-south voltage, and for this condition the clutch 57 would be energized throughout the full revolution. The gear system, and particularly the gear system 58, may be so devised that for the maximum ground speed (wind in the same direction as the aircraft is heading) of six hundred miles per hour or any other arbitrary greater value, the wheels of the latitude indicator 51 rotate the correct amount corresponding to the degrees and minutes indicated. The maximum voltage of the slide wire may, of course, be greater than the voltage components corresponding to the maximum expected air speed and wind velocity in order that no instance can arise when the instrument cannot handle the full data value. If the combined north-south voltage component of air speed and wind velocity is equal to the voltage of the slide wire just at the end of its revolution in one direction (ordinates AK and OJ, Fig. 5), the clutch 57 will have been energized throughout that full revolution of the slide wire. Consequently, the indicator 51 would have been driven by the gear systems for the full revolution of the slide wire, that is, so far as actuation for a given direction is concerned the indicator is driven continuously, in effect, and no greater movement of the indicator can be obtained in any timing interval. This may be understood further by recalling that, irrespective of the speed of motor 53, it can drive clutch 46 only one revolution during each interval since clutch energization is controlled by timer 19.

When clutch 57 is energized, the indicator 51 and slide wire 73 are mechanically directly connected by the gear systems and consequently the movement or amount of rotation of indicator 51 is directly proportional to the amount of rotation of slide wire 73. The voltage along slide wire tapped off by tap 82 is also directly proportional to the amount of rotation of slide wire 73. Hence, the value of combined air speed and wind velocity north-south component is measured, in effect, as a percentage of a full revolution of the slide wire.

As pointed out previously, it is the position of the taps 27 and 37 along the impedances 26 and 36 which determines the input value of wind velocity and air speed. Irrespective of the voltage applied to the impedances, a wind velocity of a particular value is always indicated by the same position of the tap 27 along impedance 26 and an air speed of a particular value is always indicated by the same position of the tap 37 along impedance 36.

The voltage applied to impedances 26 and 36 enters into the picture as a medium for comparing the relative combined positions of taps 27 and 37 with the rotative position of slide wire 73. Hence, the voltages applied to impedances 26 and 36 and to slide wire 73 can be any values so long as any variations therein are by the same percentage and in the same direction. In the instant case this is accomplished by energizing the slide wire 73 from the same transformer winding 74 as are the impedances 26 and 36. Hence, changes in voltage will not affect the accuracy of the instrument because the percentage of a revolution which the slide wire must rotate before the north-south component voltage is equal to the slide wire voltage remains the same. This is of advantage since is eliminates a possible source of error. The transformation ratios of the windings 28, 29 and 31 and windings 38, 39 and 41, and the degree of movement of taps 27 and 37 are so chosen that the voltage components corresponding to assigned (expected) air speeds and wind velocities are in proper proportion to each other.

Because there is a sensing of the data during each interval of two seconds, the possible error due to an incorrect sampling of the data is very much reduced. Since the value of the data is determined by the rotating slide wire or potentiometer and the null is detected by the phase detector, the apparatus operates rapidly and without delay.

The operation of one form of indicator 51, gear system 58, clutch 57, gear system 56, and additional structure thereof, may be understood best by reference to Fig. 2. In this figure the indicator 51 is shown rotatably mounted at one end of a bar 135, the other end of which is urged by a spring 136 in the direction of an abutment, as shown. A gear, wheel or the like 137 which corresponds to the gear system 58 of Fig. 2 is slidably mounted on bar 135 and is urged by means of a spring 138 into operative engagement with the wheels of indicator 51 so that rotations of member 137 cause rotations of the appropriate wheels of indicator 51.

When clutch 57 is unenergized, that is, there is no current in winding 102, the bar 135 occupies the position shown in Fig. 2 where the member 137 is in engagement with a rotatable member 139 forming part of a reset mechanism and brake including the reset knob 141. By rotating knob 141, the indicator, through the members 139 and 137, may be set to any desired value and held there while the clutch remains unenergized. When the clutch is energized, the magnet 103 pulls rod 135 downwardly and causes member 137 to engage member 140 which corresponds in part to the gear system 56 already referred to. The member 140 rotates due to the coupling of shaft 61 with gear system 56, and thus through the member 137 rotates the wheels of indicator 51. This same downward movement of rod 135 moves member 137 away from member 139 and thus releases the wheels of the indicator for rotation. When the clutch 57 becomes de-energized, the member 137 again engages member 139 and the indicator wheels are held stationary or may be reset if desired.

The apparatus for integrating the east-west components of wind velocity and air speed is substantially the same as that for the north-south components, but includes additional apparatus to take account of the fact that the meridians of longitude converge as the earth's poles are approached, that is, as the latitude increases from zero towards 90 degrees.

Referring to Figs. 1 and 2, it will be seen that the motor 53 drives the longitude indicator 52 through the one-turn clutch 54, the gear system 55, a gear system 142, a clutch 143, and a gear system 144. Because the indicator 52 is driven through the gear system 55, the indicator (if clutch 143 remains energized) may be driven in one direction for half a revolution of clutch 54 and in the other direction for the other half revolution of clutch 54, even though motor 53 rotates continuously in one direction. The gear system 55, in driving shaft 61, drives a gear 145 mounted on shaft 61 and forming part of gear system 142. The gear 145 meshes with a gear 146 which, through clutch 143, drives the gear system 144. The clutch 143 is appropriately energized during the particular revolution of shaft 61 in order that the longitude indicator may move the appropriate amount during each time interval. As already pointed out for clutch 57, the clutch 143 cannot be energized for each revolution of shaft 61, that is, for each half revolution of one-turn clutch 54, or the indicator 52 would move in one direction a certain amount followed by a movement in the reverse direction of the same amount.

The clutch 143 may be of any form, and as will be described subsequently in the specification is of the same form as clutch 57.

For determining the length of the duration of energization of clutch 143 during each time interval, there is provided so as to be rotated by shaft 61, a second slide wire or the like 147 forming part of potentiometer 14, the ends of slide wire 73 being connected to the secondary winding 74 of transformer 75 by means of conductors 70, 80 and 76, 77. Hence, the voltage applied to slide wire 147 is of the same arbitrary value as is applied to slide wire 73. Engageable with slide wire 147 is a tap 148 which taps off voltage varying from zero to full value along slide wire 147, depending on the position of the tap for comparison with the combination east-west component voltage.

Referring to Fig. 2, it may be seen best that the slide wire 147, similarly to slide wire 73, may be in the form of a spiral to the ends of which the voltage is applied from conductors 70, 80 and 76, 77 through brushes and slip rings 149 and 151, and tap 148 corresponds to a plate of the same reference character which is adapted to engage the spiral slide wire during its rotation. The spiral slide wire 147 is mounted so as to be rotated by shaft 61, as represented by the dotted line bearing this reference character in Fig. 2. The spiral slide wire 147 is of only a single revolution so that in each revolution thereof the voltage experienced by tap 148 varies from zero to the maximum value. Since shaft 61 rotates a full revolution in one direction, followed by a full revolution in the other direction, the voltage experienced by tap 148 varies from zero to a maximum and from the maximum to zero. Likewise, here, it is not necessary that the slide wire voltage follow this cycle. It may, for example, vary from zero to maximum or vice versa twice in succession.

The latitude phase resolver 15 is arranged to cooperate with the voltage of slide wire 147 and with the latitude indicator 51 to provide means to account for the convergence of the meridians of longitude. As will become clear, the east-west or longitude component of the air speed and wind velocity is converted to a voltage by means of the wind velocity and direction apparatus 12, and the air speed and heading apparatus 13, and this voltage is compared with the voltage obtained from the slide wire 147 as modified by the latitude phase resolver 15. Because of meridian convergence, the same number of miles traveled at one latitude and corresponding to a certain change in longitude will correspond to a greater change in longitude at a higher latitude. This may be visualized, for example, by comparing the east-west components of travel at the equator and at a point just south of the north pole. At the equator one nautical mile corresponds to one minute of longitude, whereas just south of the north pole a distance of a few feet or less around the pole would correspond to a change in longitude of 360 degrees. It may be shown that the same degree change of longitude occurs at one angle of latitude as occurs at the equator when the number of miles traveled east-west at that one latitude is equal, at the equator, to that number of miles divided by the cosine of the angle of latitude. That is $$\Delta \text{ long. (lat. } \alpha) = \frac{\text{miles east-west}}{\cos \alpha} \text{ (lat. } \alpha) \times K$$

Where: $\alpha$ is the angle of latitude and
$K$ is the factor converting miles and longitude at the equator.

If longitude is determined in minutes of arc initially, followed by conversion to degrees, K is equal to 1 since one nautical mile is equal to one minute of arc on any earth's great circle.

It is the function of the latitude phase resolver 15 to establish this relationship between the east-west component voltages and the voltage tapped off of slide wire 147 in order that the clutch 143 may be energized for the appropriate interval.

The latitude phase resolver 15 may comprise a pair of windings 152 and 153 magnetically coupled with each other. The winding 152 may be stationary and the winding 153 may be mechanically coupled through gear system 154 to gear 71 whereby the position of winding 153 relative to winding 152 is determined in accordance with the indications of latitude indicator 51. For example, for zero latitude, that is, at the equator, the winding 153 may be parallel to winding 152, that is, as closely coupled as possible, and for 90 degrees of latitude, that is, at the poles, the winding 153 may be at right angles to winding 152, that is, zero coupling between the windings. Actually, such a large variation is not feasible since one revolution of the slide wire represents the maximum rate of speed which can be integrated and since the voltage variation of the slide wire is fixed, it cannot be made to excite winding 153 to cause winding 152 to produce a voltage varying from a certain value to infinity $$\left(\frac{1}{\cos 90°} = \text{infinity}\right)$$

Accordingly, the latitude phase resolver 15 is designed to operate in a particular range of latitude.

Winding 153 is connected at one end to tap 148 through conductor 155 and at the other end to one end of slide wire 147 through conductor 156. Accordingly, the winding 153 is supplied with the voltage on slide wire 147, and the voltage of winding 152 is equal to the voltage of the slide wire multiplied by the cosine of the latitude angle and the turn ratio of windings 152 and 153 which may be defined as $n$. It is the output of winding 152 which is compared with the east-west voltage components of wind velocity and air speed, as may be understood by tracing the circuits thereof as follows.

The circuits for exciting impedances 26 and 36 and windings 28 and 38 are as already described. The east-west component windings 31 and 41 are connected in series by means of a conductor 157, and the combined voltages of these two windings appear across terminals 158 and 159 by virtue of conductors 161 and 162. Whether or not the voltages of windings 31 and 41 add to, or subtract from, each other depends upon whether the east-west components of wind velocity are in the same direction as, or in opposition to, the east-west components of the airplane speed, and the turns of the windings of the wind direction resolver 23 and of the true heading resolver 25 are oriented so as to take this into account. The tapped off voltage of slide wire 147 multiplied by the cosine of the latitude angle $\alpha$ and $n$, the turn ratio of windings 152 and 153, appears across terminals 158 and 163 and is obtained through a circuit as follows: From terminal 163 through conductor 164, winding 152, and conductor 165 to terminal 158. The voltage of slide wire 147 is supplied to the winding 153 through the following circuit: From one terminal of winding 153 through conductor 156, brush and slip ring 151, a proportion of slide wire 147, tap 148, and conductor 155 to the other terminal of winding 153. The difference of the voltages appearing at terminals 158 and 159 (the resultant or combined east-west component of wind velocity and air speed) and the terminals 158 and 163 (the slide wire voltage varying from zero to its maximum value multiplied by the cosine $\alpha$ and the turn ratio $n$ appears across terminals 159 and 163 and is applied to the primary 166 of transformer 167, whose secondary winding is 168. The difference voltage appearing across terminals 159 and 163 is utilized to control functioning of the east-west detector 16 and consequently energization of clutch 143, all of which may be explained as follows.

The east-west phase detector comprises a pair of thyratron type tubes 169 and 171 connected in full wave relationship, current conduction through these tubes being determined by the in-phase and out-of-phase relationship of the plate voltage supplied from secondary winding 74 and the grid voltage supplied from secondary winding 168, similarly to the north-south phase detector 17 already described. Plate voltage is applied to the tube 169 through a circuit which may be traced as follows: From the left end of winding 74 through conductors 97 and 172 to the plate of the tube, and from the center tap of winding 74 through conductors 99 and 173, the coil 174 of clutch magnet 175, and conductors 176 and 177 to the cathode of tube 169. Plate voltage is applied to tube 171 through a circuit which may be traced as follows: From the right end of winding 74 through conductors 106 and 178 to the plate of the tube, and from the center tap of winding 74 through conductors 99 and 173, the winding 174, and conductors 176 and 179 to the cathode of tube 171. Grid voltage is applied to tube 169 through a circuit which may be traced as follows: From the grid of tube 169 to the left end of winding 168, through conductor 181, and from the center tap of winding 168 through conductors 182 and 177 to the cathode of the tube. Grid voltage is applied to the tube 171 through a circuit which may be traced as follows: From the grid to the right end of winding 168 through conductor 183, and from the center of winding 168 through conductors 182 and 179 to the cathode.

The tubes 169 and 171 are supplied with plate voltage from the same source as tubes 95 and 96, and are supplied with grid voltage through the circuits described, this voltage ultimately having its origin from the same source as does the grid voltage of tubes 95 and 96. Hence, tubes 169 and 171 operate as explained in connection with tubes 95 and 96.

Whenever the winding 174 has current flowing therethrough, the magnet 175 becomes energized to effect engagement of clutch 143, and the flow of current through winding 174 is determined by the product of the slide wire voltage, the turn ratio $n$ and the cosine of the latitude angle and the combined east-west component voltages, as appear at terminals 158 and 159.

The series of sine waves shown in Fig. 3 may also represent the voltages applied to tubes 169 and 171. In this instance $e_p$ represents the plate-cathode voltage of tube 169, for example, the solid curve $e_i$ may represent the combined east-west voltage components (combined wind velocity and air speed components) when the aircraft is heading west, for example, but the curve labeled $e_{sw}$ represents the slide wire voltage at a particular time multiplied by the cosine of the latitude angle and the turn ratio $n$, it being noted that the latter voltage is in opposition to the combination east-west voltage (that is, negative). The windings 166 and 168 of transformer 167 are so wound that the slide wire voltage is negative with respect to the plate cathode voltage and so that the grid voltages and the plate voltages of the tubes are of the correct relative magnitudes. The voltage relationship may be further visualized by referring to Fig. 5, as in the instance of describing the north-south operation, wherein the horizontal lines now represent values of $e_i$ or combination east-west voltages, and the lines OA and AB represent the slide wire voltage variations multiplied by the cosine of the latitude angle and the turn ratio $n$ throughout the whole cycle of slide wire operation. Since slide wire 147 is operated by shaft 61 and shaft 61 rotates first in one direction a full revolution and then in the opposite direction for a full revolution, the slide wire 147 makes these same revolutions, and the slide wire voltage varies uniformly from zero to its arbitrary maximum negative value and from zero to its arbitrary maximum value to zero during each timing interval. Hence, the voltage which is actually used for comparison with the east-west components, i. e. the slide wire voltage multiplied by the cosine of the latitude angle, and the turn ratio $n$ varies from zero to a negative maximum and therefrom to zero in each timing cycle.

At the equator, i. e. latitude is zero, the winding 153 lies at an angle $\alpha$ of zero degrees relative to winding 152, the cosine of the latitude angle $\alpha$ is one, and the slide wire voltage multiplied by the turn ratio $n$ is the voltage of winding 152. Hence, the maximum value of voltage which is available for comparison with the east-west component voltages is the product of the maximum slide wire voltage (full revolution) and the turn ratio $n$. If the aircraft is at 45 degrees of latitude, for example, the winding 153 lies at an angle $\alpha$ of 45 degrees relative to winding 152 and the slide wire voltage is multiplied by the cosine of 45 degrees, that is, by the factor .707 at each instant and by the factor $n$ to give the voltage of winding 152. Here, the maximum value of voltage which is available for comparison with the east-west component voltages is equal to .707 times the maximum slide wire voltage and the turn ratio $n$, and it takes a full revolution of the slide wire to produce it.

To make full use of the instrument for east-west components, as in the case of north-south components, a full revolution of the slide wire corresponds to the maximum combined east-west wind velocity and air speed. This can be met, however, at only one latitude.

Since an airplane may travel at the assigned or expected maximum ground speed (the wind velocity and air speed are in the same direction) at any latitude and since the wind velocity potentiometer 22 and the air speed potentiometer 24 are set at their values without regard to latitude, the east-west component voltages from windings 31 and 41 are the same at any latitude for the same values of wind velocity and air speed. Thus, it is essential that there be available at all latitudes sufficient voltage in winding 152 to equal at some point throughout a full revolution of slide wire 147 to equal the maximum east-west component voltage. Consequently, since the maximum voltage of winding 152 available for comparison with the combination east-west component decreases as the latitude increases by the factor of cos $\alpha$, the turn ratio of winding 152 to winding 153 must be equal to $$\frac{1}{\cos \alpha}$$

at the highest latitude to be encountered for the full revolution of slide wire 147 to be able to measure the maximum east-west ground speed. Hence, if the maximum latitude for which the instrument is to operate is 45 degrees, the turn ratio $n$ is $$\frac{1}{.707}$$

or 1.414. At lower latitudes, the voltage of winding 152 for this case will be greater for a full revolution of the slide wire by the factor $$\frac{1}{\cos \alpha}$$

or 1.414 at the equator and a lesser proportion of a revolution is necessary to measure the same ground speed. Conceivably, if the instrument should be intended to operate over a range extending from the equator to a latitude of 80 degrees, the cosine of 80 degrees being .174, the turn ratio $n$ would be $$\frac{1}{.174}$$

or 5.75, for a full revolution of the slide wire to be able to measure the maximum east-west combination of wind velocity and air speed. With such an instrument, at the equator where cosine of latitude is zero, the maximum voltage of winding 152 for a full revolution of the slide wire is 5.75 times the slide wire voltage. Hence to be able to measure the maximum east-west combination of air speed and wind velocity at the equator, the slide wire 147 needs to rotate only $$\frac{1}{5.75}$$

or .174 of a revolution. That is, the clutch 143 would be energized for only .174 of a revolution of the slide wire for maximum east-west ground speed and proportionately less for lesser ground speeds. It is apparent, then, that the accuracy of the instrument, when designed to operate at high latitudes, is less at low latitudes. Consequently, the instruments are designed to operate within a specified degree of latitude to conform to the accuracy desired at the lower latitudes.

With the foregoing explanation in mind, the further operation of the longitude indicator may be explained best by a series of examples in connection with Figs. 3–6. It is assumed the instrument has been adapted to operate only up to a latitude of 45 degrees and, in the first instance, that the aircraft is at the equator and is headed west and thus the longitude indicator is to indicate degrees of longitude west. For this condition, at the instant the clutch 54 operates to effect rotation of shaft 61, and consequently of slide wire 147, the slide wire voltage is zero, as represented by the origin O in Fig. 5, since the tap 148 is at the beginning of the slide wire. At that instant the properly combined value of the east-west wind velocity and air speed component may be one-half of the maximum value represented by the ordinate OC, that is, $e_i = OC$. There is then a positive value of voltage applied to the grids of tubes 169 and 171 whereupon these tubes conduct current during alternate half cycles which flows through winding 174 and energizes clutch 143. Thereby the londitude indicator is caused to move through the gears shown. As the slide wire 73 rotates, however, its voltage increases negatively, and the product of slide wire voltage, cos 45° and $n = 1.414$ increases negatively, i. e. the voltage of winding 152 as indicated by the line OA, and when this voltage becomes equal to the north-south component, that is, $OC = DE$, the difference between the slide wire voltage and the east-west component voltage is zero, and the voltage applied across terminals 163 and 159, that is, to the grid of tube 169, is zero. When the plate voltage $e_p$ next comes through zero (Fig. 3) at the beginning of a positive cycle, the current does not begin to flow since the continued rotation of the slide wire causes decreasing of the voltage of winding 152 along the line OA and thus places a negative voltage on the grid of tube 95. To produce the equality of east-west component voltage and the voltage of winding 152 only .707×½ or .354 of revolution of the slide wire was needed, whereas in the corresponding north-south case a half of a revolution is needed. As explained in connection with the operation of the north-south apparatus, if the combined air speed and wind velocity had been greater, perhaps equal to one of the ordinates OF or OJ, the slide wire would have had to rotate proportionately further before the conduction of current through the clutch energizing winding ceased but less so, due to the transformation ratio $n$.

Also, as pointed out in connection with the north-south phase detector 17, when the slide wire 147 revolves in the reverse direction during the particular time interval, the clutch is de-energized through the provision of the commutator 113 which reverses the east-west component voltage at the instant the slide wire has completed its forward revolution and is about to begin its rearward revolution. This mechanism, also as previously described for southerly changes in latitude in connection with Fig. 6, permits the aircraft to indicate longitude east instead of longitude west, but in this instance the clutch for moving the longitude indicator is energized during the second revolution of the slide wire in proportion to the combined east-west components of wind velocity and air speed.

Suppose that the aircraft is at 45 degrees of latitude north and headed due west. In this instance the winding 153 lies at 45 degrees relative to winding 152 and the voltage induced into winding 152 is equal to the voltage of the slide wire multiplied by the ratio $n$ and by the cosine of 45 degrees, that is, by .707. Suppose further in this instance that the aircraft is traveling at the assigned maximum combined value of air speed and wind velocity. That is, the wind velocity potentiometer and the true air speed potentiometer taps 27 and 37, respectively, have been set to their maximum positions and the combined east-west component voltage corresponds to the ordinate OJ of Fig. 5.

To properly indicate this condition, the longitude indicator 52 must be coupled to the driving gear system, i. e. clutch 143 is energized, for the full proportion of the time interval corresponding to a full revolution of the slide wire. At the beginning of the timing instant, the slide wire voltage is zero, at the origin O of Fig. 5. The combined east-west component voltage corresponds to the ordinate OJ and is applied to the grids of tubes 169 and 171. These tubes conduct in alternate half cycles, current flows through winding 174 to energize clutch 143, and the longitude indicator moves.

The indicator continues to move and the voltage of the slide wire increases negatively. At each instant throughout the revolution of the slide wire the voltage of winding 152 is equal to the product of the slide wire voltage $e_{sw}$, the $\cos \alpha$ and $n$. The $\cos 45° = .707$ and $$n = \frac{1}{.707}$$

whereby the voltage of winding 152 is $e_{sw}$. The voltage of winding 152 follows along line OA and after a full revolution of the slide wire corresponds to AK and is equal to OJ. At this point the voltage applied to the grids is zero, current conduction stops, clutch 143 becomes de-energized, and the longitude indicator stops for that timing cycle. For maximum conditions at 45 degree latitude, the longitude indicator runs throughout a full revolution of the slide wire in one direction. For changes in longitude in the reverse direction the longitude indicator operates during a proper proportion of the reverse revolution of slide wire.

While examples involving travel at latitudes from zero degrees to 45 degrees and from zero degrees to 80 degrees have been given, it will be clear that any range may be chosen by following the teachings set forth. Operation of such instruments at latitudes above 80 degrees may require instruments operable only through a very short range since the cosine of angles approaching 90 degrees changes rapidly.

The ratio of gears in gear systems 142 and 144 is such that, for the instance chosen of maximum latitude, and for maximum assigned conditions, the longitude indicator moves the maximum amount. It may be assumed that the maximum assigned ground speed is 600 miles per hour which can be east-west at 45 degree latitude, the maximum latitude for the particular instrument. The 600 M. P. H. (statute) may consist of 500 M. P. H. of air speed and 100 M. P. H. of wind velocity. Six hundred M. P. H. corresponds to .167 mile per second or .333 mile per two-second time interval. At the equator .333 statute mile corresponds to .289 minutes of longitude. At 45 degree latitude, .333 statute mile corresponds to .409 minute of longitude. Hence, the longitude indicator must change .409 minute during every timing cycle of two seconds if the clutch 143 is energized for the full revolution of the slide wire, with proportionate decreases in longitude changes for proportions of revolutions of the slide wire. The gear systems of the latitude indicator are correspondingly designed.

For east-west travel, as in the instance of north-south travel, the voltage output of the wind velocity and air speed apparatus and from the slide wire 147 through the latitude phase resolver 15 forms the medium for comparing the combined positions of the wind velocity potentiometer and the air speed potentiometer with the rotational position of the slide wire in each time interval. Thus, at a latitude of 45 degrees for the particular apparatus described, if the air speed and wind velocity are set at one-half of the assigned maximum values, the slide wire will rotate one-half of a revolution in each time interval before the indicator is unclutched and the indicator will move one-half its maximum amount. And if the air speed and wind velocity apparatus are set at the maximum assigned values, the slide wire rotates a full revolution in each time interval before the indicator is unclutched and the indicator will move its maximum amount. Proportionate effects occur at other latitudes. The degree of rotation alone of the slide wire determines the degree of movement of the longitude indicator. The voltages of the slide wire and of the air speed and wind velocity apparatus entering only as a medium of comparison of the positions of these devices, the absolute magnitude of the voltage applied to and taken from the slide wire and the air speed and wind velocity apparatus is relatively unimportant so long as the same changes percentagewise occur at all points, when changes occur.

Since in each time interval a full revolution of the slide wire corresponds to an assigned number of miles and the positions of the wind velocity potentiometer and air speed potentiometer correspond to assigned numbers of miles, in the east-west apparatus, miles at lat. $\alpha \times \cos \alpha$ is equated with miles in an absolute sense, consequently miles at $$\text{lat. } \alpha = \frac{\text{miles}}{\cos \alpha}$$

The turn ratio of windings 152 and 153, in effect, changes the voltage of the windings 31 and 41 which correspond to miles and thus may be included in the number of miles assigned to the positions of the air speed and wind velocity apparatus for the east-west direction. As an alternative, the ratio $n$ may be made equal to one and the number of turns of windings 31 and 41 or the number of turns of winding 166 may be of appropriate values. Thus with due regard for the constant K the apparatus solves the equation previously set forth.

The longitude indicator 52, the clutch 143, and associated apparatus may be of the same form as the corresponding apparatus for producing latitude indications. Referring more particularly to Fig. 2, the longitude indicator 52 is shown rotatably mounted at one end of a bar 191, the other end of which is urged by a spring 192 in the direction of an abutment, as shown. A gear wheel or the like 193 which corresponds to the gear system 144 of Fig. 2 is slidably mounted on bar 191 and is urged by means of spring 196 into operative engagement with the wheels of indicator 52 so that rotations of member 193 cause rotations of the appropriate wheels of indicator 52.

When clutch 143 is unenergized, that is, there is no current in winding 174, the bar 191 occupies the position shown in Fig. 2 where member 193 is in engagement with a rotatable member 194 forming part of a reset mechanism and brake including the reset knob 195. By rotating knob 195, the indicator, through the members 194 and 193, may be set to any desired value and held there while the clutch remains unenergized. When the clutch is energized, the magnet 175 holds rod 191 downwardly and causes member 193 to engage member 197 which corresponds in part to the gear system 142, already referred to. The member 197 rotates due to the coupling of shaft 61 with gear system 142 and thus, through member 193, rotates the wheels of indicator 52. The same downwardly movement of rod 191 moves member 193 away from member 194 and thus releases the wheels of the indicator for rotation. When the clutch 143 becomes de-energized, the member 193 again engages member 194 and the indicator wheels are held stationary or may be reset if desired.

With the apparatus as described, continuous indications of latitude and longitude may be obtained. The instrument is constructed so that the angle $\alpha$ between windings 152 and 153 corresponds to the degree indications of latitude indicator 51. Thereafter, any change in the setting of indicator 51 may, by manipulating the reset knob 141, produce corresponding changes in the angle between windings 152 and 153.

For a relatively long trip, the latitude and longitude indicators 51 and 52 may be set at the beginning of the trip and not disturbed until the end of the trip. However, where an aircraft is transported from one point to another, such for example as on an aircraft carrier, the indicators may be set at the beginning of each excursion from the carrier.

Without further elaboration, the foregoing will so fully explain the gist of my invention that others may, by applying current knowledge, readily adapt the same for use under varying conditions of service, without eliminating certain features, which may properly be said to constitute the essential items of novelty involved, which items are intended to be defined and secured to me by the following claims.

I claim:

1. An aircraft ground position indicator comprising, means for obtaining the magnitudes of the east-west and north-south components of the true air speed as a percentage of an assigned maximum value, means for obtaining the magnitude of the east-west and north-south components of wind velocity as a percentage of an assigned maximum value, means for combining said north-south components, means for sensing at specified and substantially constant time intervals the magnitude of the combined north-south components as a percentage of the combined maximum values of air speed and wind velocity, a latitude indicator, means for driving said latitude indicator an amount proportional to the percentage magnitude of said combined north-south components during each of said intervals, a longitude indicator, means for combining said east-west components, means for sensing during each of said specified intervals the value of the quotient of said combined east-west components and the cosine of the angle of latitude as a percentage of an assigned maximum value, and means for driving said longitude indicator during each of said intervals an amount proportional to said last-mentioned percentage magnitude.

2. An aircraft position indicator comprising, means for obtaining voltage magnitude components of the east-west and north-south components of the true air speed and wind velocity as a percentage of assigned maximum values, means for combining said north-south components, continuously rotatable potentiometer means for sensing the value of said combined north-south components during specified and substantially constant time intervals, a latitude indicator, means for driving said latitude indicator an amount proportional to the percentage magnitude of said combined north-south components during each of said intervals, a longitude indicator, means for combining said east-west components, continuously rotatable potentiometer means and means responsive to the reading of said latitude indicator for sensing during each of said specified intervals the value of the quotient of combined east-west components and the cosine of the angle of latitude as a percentage of an assigned maximum value, and means for driving said longitude indicator during each of said intervals an amount proportional to the magnitude of said last-mentioned percentage.

3. An integrating device comprising, means for obtaining a voltage corresponding to the instantaneous value of the quantity to be integrated, a potentiometer to be driven through a voltage cycle varying uniformly between two certain values one of which is zero during each one of successive time intervals, said intervals being substantially constant and sufficiently short so that the quantity to be integrated is sensibly constant therein, means for continuously comparing said voltage with said potentiometer voltage varying from one of said certain values to the other during each of said intervals, a cumulative indicator, and means controlled by said comparing means for driving said indicator in each of said intervals an amount proportional to the magnitude of said quantity during said interval.

4. An integrating device comprising, means for obtaining a voltage magnitude corresponding to a measured quantity as a percentage of an assigned maximum voltage value corresponding to the maximum quantity to be integrated, a potentiometer to be driven through a voltage cycle varying uniformly between two certain values one of which is zero and the other of which is an arbitrary value during each of successive time intervals, the displacement of said potentiometer between said certain values corresponding to said maximum assigned value, said intervals being substantially constant and sufficiently short that the quantity to be integrated is sensibly constant therein, means for continuously comparing said voltage magnitude with a voltage derived from said potentiometer and indicating at each instant of the potentiometer displacement the percentage of full displacement from one of said certain values to the other during each of said intervals, a cumulative indicator, and means controlled by said comparing means for driving said indicator in each of said intervals an amount proportional to the displacement of said potentiometer during its cycle between said zero value and the value of potentiometer voltage which equals said voltage magnitude during such interval.

5. An integrating device comprising, means for obtaining a voltage magnitude corresponding to a measured quantity as a percentage of an assigned maximum voltage value corresponding to the maximum quantity to be integrated, a continuously rotatable potentiometer to be driven through a voltage cycle varying uniformly between zero and an arbitrary value and between said arbitrary value and zero during each of successive time intervals, the displacement of said potentiometer between said zero and arbitrary values corresponding to said maximum assigned value, said intervals being substantially constant and sufficiently short so that the quantity to be integrated is sensibly constant therein, means for continuously comparing said voltage magnitude with a voltage derived from said potentiometer and indicating at each instant of the potentiometer displacement the percentage of full displacement throughout the complete voltage cycle, a cumulative indicator movable in both positive and negative directions, and means controlled by said comparing means for driving said indicator during each interval in a positive or negative direction depending upon whether the quantity voltage is negative or positive by an amount proportional to the displacement of said potentiometer during its cycle between a zero value of potentiometer voltage and a value equal to said voltage magnitude during such interval.

6. An integrating device comprising, means for obtaining a voltage magnitude corresponding to a measured quantity as a percentage of an assigned maximum voltage value corresponding to the maximum quantity to be integrated, a continuously rotatable potentiometer having a voltage varying uniformly between two values one of which is zero and the other of which is an arbitrary value equal to or greater than assigned maximum voltage value of the quantity to be integrated, means for driving said potentiometer through variations of its voltage between said two values twice in each time interval, the displacement of said potentiometer between said two values corresponding to said maximum assigned value of said quantity, said intervals being substantially constant and sufficiently short so that the quantity to be integrated is sensibly constant therein, means for continuously comparing said voltage magnitude with a voltage derived from said potentiometer and indicating at each instant of the potentiometer displacement the percentage of full displacement and obtaining the difference thereof throughout each of said variations, a cumulative indicator, means for driving said indicator during each of such intervals in a positive direction during one of said potentiometer variations and in a negative direction during the other of said potentiometer variations, means for coupling said indicator and said indicator drive means, and means responsive to positive voltages greater than zero for energizing said coupling means, said potentiometer voltage being oriented to be always zero or less, means for reversing said voltage magnitude at the end of each one of said potentiometer variations, and means for feeding said difference voltage to said responsive means.

7. An integrating device comprising, means for obtaining a voltage magnitude as a percentage of an assigned maximum value of the quantity to be integrated, timing means for determining substantially equal intervals of time, said intervals being sufficiently short so that said quantity is sensibly constant therein, a rotatable slide wire potentiometer having a voltage varying uniformly between two values one of which is zero and the other of which is an arbitrary value equal to or greater than said assigned maximum voltage value of the quantity to be integrated, motor means of relatively high speed, one-turn clutch means connected to said motor means effected to operate in each interval by said timing means, said motor speed being sufficient to drive said clutch one revolution in each of said intervals, reversible gear means connecting said clutch means and said potentiometer for driving said potentiometer through two variations of its voltage between two values one of which is zero and the other of which is an arbitrary value equal to or greater than said assigned maximum value of said quantity voltage in each of said intervals, means for continuously comparing said voltage magnitude with a voltage derived from said potentiometer and indicating at each instant of the potentiometer displacement the percentage of full displacement and obtaining the difference therein throughout each of said variations, a cumulative indicator, clutch means connecting said indicator with said reversible gear means whereby said indicator is drivable in a positive direction during one of said potentiometer variations and in a negative direction during the other of said potentiometer variations, means responsive to positive voltages greater than zero for energizing said clutch means, said potentiometer voltage being oriented to be always zero or less, commutator means connected to said one-turn clutch for reversing said voltage magnitude at the end of each one of said potentiometer variations, and means for feeding said difference voltage to said responsive means.

8. An aircraft ground position indicator comprising, means for obtaining the voltage magnitudes of the east-west and north-south components of the true air speed and wind velocity as a percentage of assigned maximum voltage values, means for combining said north-south components, a first continuously rotatable potentiometer means having a voltage cycle varying uniformly between two certain values one of which values is zero and the other of which is an arbitrary value corresponding to the assigned maximum voltage values of combined north-south components, means for driving said first potentiometer means through its cycle during each of successive time intervals, said intervals being substantially constant and sufficiently short so that the north-south component is sensibly constant therein, means for continuously comparing said north-south component voltage magnitude with a voltage derived from said first potentiometer and indicating at each instant of the potentiometer displacement the percentage of full displacement from one of said certain values to the other during each of said intervals, a latitude indicator, means for coupling the latitude indicator to the driving means, means controlled by said comparing means for energizing said latitude indicator coupling means in each of said time intervals for a length of time equal to the time necessary for the first potentiometer to be displaced between said zero value and the value of the first potentiometer voltage which equals the north-south component voltage during such interval, means for combining said east-west components, second continuously rotatable potentiometer means having a voltage cycle varying uniformly between two certain values one of which is zero and the other of which is an arbitrary value corresponding to the assigned maximum combined east-west components, the second potentiometer means being driven by the driving means through its cycle during each of said successive intervals, means associated with said latitude indicator and receiving a voltage derived from said second potentiometer and indicating at each instant of the second potentiometer displacement the percentage of full displacement for producing the product of said second potentiometer voltage and the cosine of the latitude angle, means for continuously comparing said combined east-west component voltage with said product voltage from one of said second potentiometer certain values to the other during each of said intervals, a longitude indicator, means for coupling the longitude indicator to the driving means, means controlled by said comparing means for energizing said longitude indicator coupling means in each of said intervals for a length of time equal to the time necessary for said second potentiometer to be displaced between its zero value and the value of the second potentiometer voltage where the product thereof and the cosine of the latitude angle equals the east-west component voltage during such interval.

9. An aircraft ground position indicator comprising, means for obtaining the voltage magnitudes of the east-west and north-south components of the true air speed and wind velocity as a percentage of assigned maximum voltage values, means for combining said north-south components, a first potentiometer means to be driven twice in each of successive time intervals through a voltage cycle varying uniformly between two certain values one of which is zero and the other of which is an arbitrary value corresponding to the assigned maximum combined north-south components, said intervals being substantially constant and sufficiently short so that the north-south component is sensibly constant therein, means for continuously comparing said north-south component voltage magnitude with a voltage derived from said first potentiometer and indicating at each instant of the potentiometer displacement of the percentage of full displacement throughout the complete voltage cycle, a latitude indicator movable in both positive and negative directions, means controlled by said comparing means for driving said latitude indicator in each of said time intervals in a positive or negative direction depending upon whether the north-south component voltage is positive or negative by an amount proportional to the displacement of said first potentiometer during its cycle between said zero value and the value of the first potentiometer voltage which equals the said north-south component voltage magnitude during such interval, a longitude indicator, means for combining said east-west components, second potentiometer means to be driven twice in each of said successive intervals through a voltage cycle varying uniformly between two certain values one of which is zero and the other of which is an arbitrary value corresponding to the assigned maximum combined east-west components, means associated with said latitude indicator and receiving a voltage derived from said second potentiometer and indicating at each instant of the second potentiometer displacement the percentage of full displacement for producing the product of said second potentiometer voltage and the cosine of the latitude angle, means for continuously comparing said combined east-west component voltage with said product voltage throughout the complete voltage cycle, a longitude indicator movable in both positive and negative directions, means controlled by said comparing means for driving said longitude indicator in each of said time intervals in a positive or negative direction depending upon whether the east-west component voltage is positive or negative by an amount proportional to the displacement of said second potentiometer during its cycle between said zero value and the value of the second potentiometer voltage where the product thereof and the cosine of the latitude angle equals the east-west component voltage during such interval.

10. An aircraft ground position indicator comprising, means for obtaining the voltage magnitudes of the east-west and north-south components of the true air speed and wind velocity as a percentage of assigned maximum voltage values, means for combining said north-south components, a first continuously rotatable potentiometer having a voltage varying uniformly between two certain values one of which is zero and the other of which is an arbitrary value corresponding to the assigned maximum combined north-south components, means for driving said first potentiometer through its variations of its voltage between said two values twice in a predetermined time interval, said intervals being substantially constant and sufficiently short so that the north-south component is sensibly constant therein, means for continuously comparing said north-south component voltage magnitude with a voltage derived from said first potentiometer and indicating at each instant of the potentiometer displacement the percentage of full displacement and obtaining the difference thereof throughout each of said variations, a latitude indicator, means for driving said latitude indicator during each of such intervals in a positive direction during one of said first potentiometer variations and in a negative direction during the other of said first potentiometer variations, means for coupling said latitude indicator and the drive means therefor, first means responsive to positive voltages greater than zero for energizing said latitude indicator coupling means, said first potentiometer voltage being oriented to be always zero or less, means for reversing said north-south component voltage at the end of each one of said first potentiometer variations, means for feeding said first difference voltage to said first responsive means, means for combining said east-west components, a second continuously rotatable potentiometer having a voltage varying uniformly between two certain values one of which is zero and the other of which is an arbitrary value corresponding to the assigned maximum combined east-west components, said driving means driving said second potentiometer through its variations of its voltage between its two values twice in each interval, means associated with said latitude indicator and receiving a voltage derived from said second potentiometer and indicating at each instant of the second potentiometer displacement the percentage of full displacement for producing the product thereof and the cosine of the latitude angle, means for continuously comparing said combined east-west component voltage magnitude with said product voltage and obtaining the difference thereof throughout each of said variations, a longitude indicator, means for driving said longitude indicator during each of such intervals in a positive direction during one of said second potentiometer variations and in a negative direction during the other of said second potentiometer variations, means for coupling said longitude indicator and the drive means therefor, second means responsive to a positive voltage greater than zero for energizing said longitude indicator coupling means, said second potentiometer voltage being oriented to be always zero or less, said north-south reversing means also reversing said east-west component voltage at the end of each one of said second potentiometer variations, and means for feeding said second difference voltage to said second responsive means.

11. An aircraft ground position indicator comprising, timing means for determining substantially equal intervals of time, means for obtaining the voltage magnitudes of the east-west and north-south components of the true air speed and wind velocity as a percentage of assigned maximum values, means for combining said north-south components, said timing intervals being sufficiently short so that said north-south and said east-west components are sensibly constant therein, a first rotatable slide wire potentiometer having a voltage varying uniformly between two values one of which is zero and the other of which is an arbitrary value corresponding to the assigned maximum north-south component, motor means of relatively high speed, one-turn clutch means connected to said motor means and effected to operate once in each of said intervals by said timing means, said motor speed being sufficient to drive said clutch one revolution in each of said intervals, reversing gear means connecting said clutch means and said first potentiometer means for driving said potentiometer through two variations of its voltage in each of said intervals, means for continuously comparing said combined north-south component voltage magnitude with a voltage derived from said first potentiometer and indicating at each instant of the potentiometer displacement the percentage of full displacement and obtaining the difference therein throughout each of said variations, a latitude indicator, second clutch means for connecting said indicator with said reversing gear means whereby said latitude indicator is drivable in a positive direction during one of said potentiometer variations and in a negative direction during the other of said potentiometer variations, first means responsive to positive voltages greater than zero for energizing said second clutch means, said first potentiometer voltage being oriented to be always zero or less, commutator means connected to said one-turn clutch for reversing said combined east-west voltage component at the end of each one of said potentiometer variations, means for feeding said difference voltage to said first responsive means, means for combining said east-west components, a second rotatable slide wire potentiometer having its voltage varying uniformly between two values one of which is zero and the other of which is an arbitrary value corresponding to the assigned maximum east-west components, means associated with said latitude indicator and receiving a voltage derived from said second potentiometer and indicating at each instant of the second potentiometer displacement the percentage of full displacement for producing the product thereof and of the cosine of the latitude angle, gear means including said reversing gear means connecting said first clutch means and said second potentiometer means for driving said second potentiometer means through two variations of its voltage in each of said intervals, means for continuously comparing said combined east-west component voltage magnitude with said product voltage and obtaining the difference therein throughout each of said variations, a longitude indicator, third clutch means for connecting said longitude indicator with said gear means whereby said longitude indicator is drivable in a positive direction during one of said second potentiometer variations and in a negative direction during the other of said potentiometer variations, second means responsive to positive voltages greater than zero for energizing third clutch means, said second potentiometer voltage being oriented to be always zero or less, said commutator means also reversing said combined east-west component voltage magnitude at the end of each one of said second potentiometer variations, and means for feeding said second difference voltage to said second responsive means.

References Cited in the file of this patent

UNITED STATES PATENTS

| | | |
|---|---|---|
| 2,406,836 | Holden | Sept. 3, 1946 |
| 2,425,346 | Rippere | Aug. 12, 1947 |
| 2,428,770 | Albert | Oct. 14, 1947 |
| 2,428,800 | Holden | Oct. 14, 1947 |
| 2,434,270 | Holden | Jan. 13, 1948 |
| 2,467,624 | Agins | Mar. 29, 1949 |
| 2,467,646 | Agins | Apr. 19, 1949 |
| 2,475,314 | Dehmel | July 5, 1949 |
| 2,495,753 | Mozley | Jan. 31, 1950 |
| 2,500,545 | Herbst | Mar. 14, 1950 |

FOREIGN PATENTS

| | | |
|---|---|---|
| 718,305 | Germany | Apr. 7, 1942 |